United States Patent [19]
Würger

[11] Patent Number: 5,675,925
[45] Date of Patent: Oct. 14, 1997

[54] SYSTEM FOR RENDERING A HAND WEAPON INOPERABLE

[75] Inventor: Franz Würger, Rottweil, Germany

[73] Assignee: Mauser-Werke Oberndorf Waffensysteme GmbH, Oberndorf, Germany

[21] Appl. No.: 671,706

[22] Filed: Jun. 28, 1996

[30] Foreign Application Priority Data

Jun. 28, 1995 [DE] Germany ............... 195 23 399.9

[51] Int. Cl.$^6$ ............................................. F41A 17/00
[52] U.S. Cl. ................................. 42/70.11; 42/70.06
[58] Field of Search .................. 42/70.11, 70.06; 89/41.07; 102/214; 116/18

[56] References Cited

U.S. PATENT DOCUMENTS

| | | | |
|---|---|---|---|
| 4,467,545 | 8/1984 | Shaw, Jr. ........................ | 42/70 R |
| 4,488,370 | 12/1984 | Lemelson ....................... | 42/70 R |
| 4,563,827 | 1/1986 | Heltzel ........................... | 42/70 R |
| 4,682,435 | 7/1987 | Heltzel ........................... | 42/70.01 |
| 5,168,114 | 12/1992 | Enget .............................. | 42/70.01 |
| 5,448,847 | 9/1995 | Teetzel .......................... | 42/70.11 |
| 5,461,812 | 10/1995 | Bennett .......................... | 42/70.11 |
| 5,487,234 | 1/1996 | Dragon .......................... | 42/70.07 |
| 5,546,690 | 8/1996 | Ciluffo .......................... | 42/70.11 |

Primary Examiner—Charles T. Jordan
Assistant Examiner—Meena Chelliah
Attorney, Agent, or Firm—Spencer & Frank

[57] ABSTRACT

There is disclosed a combination of a signal-receiving system and a hand weapon. The signal-receiving system is incorporated in the hand weapon and includes a signal-receiving unit for receiving a coded signal and an evaluating unit connected to the signal-receiving unit for receiving the coded signal therefrom, for processing the coded signal and for emitting an actuating signal as a function of the coded signal for affecting operationally essential elements of the hand weapon.

2 Claims, 1 Drawing Sheet

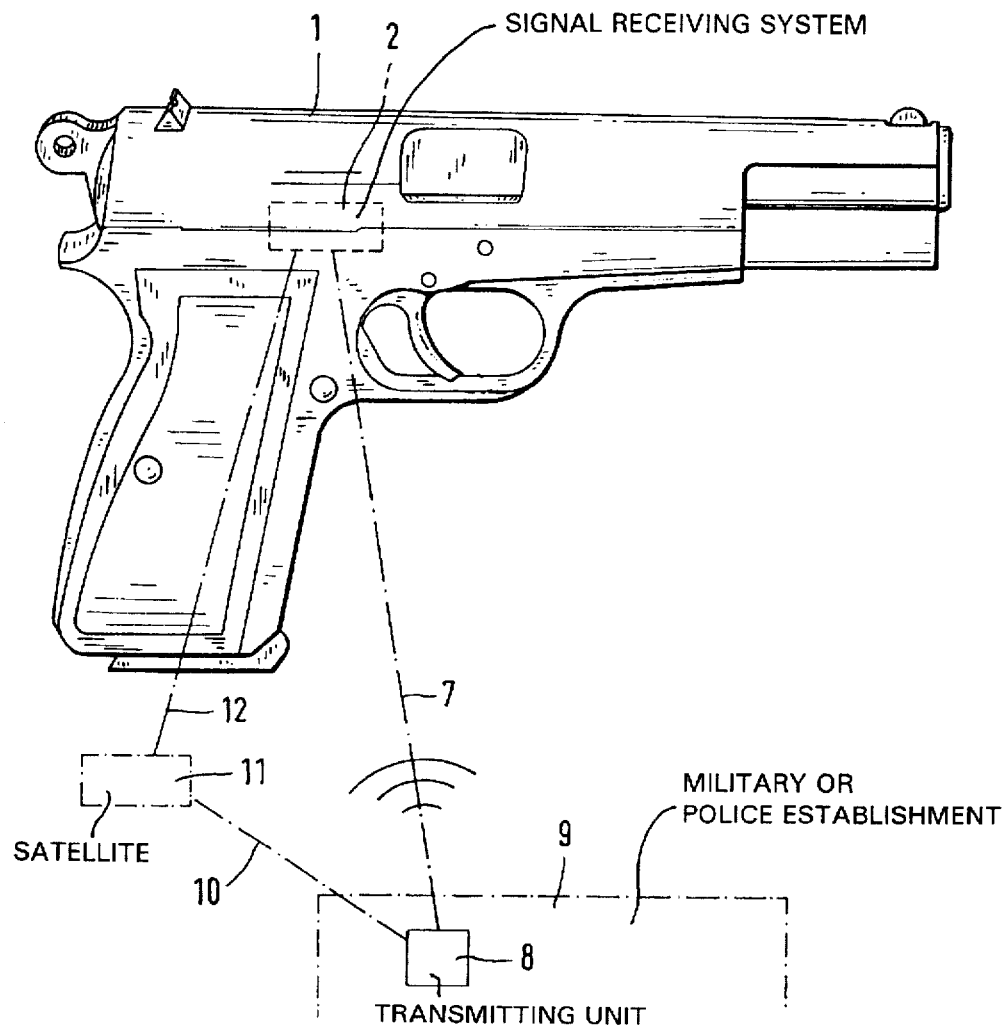
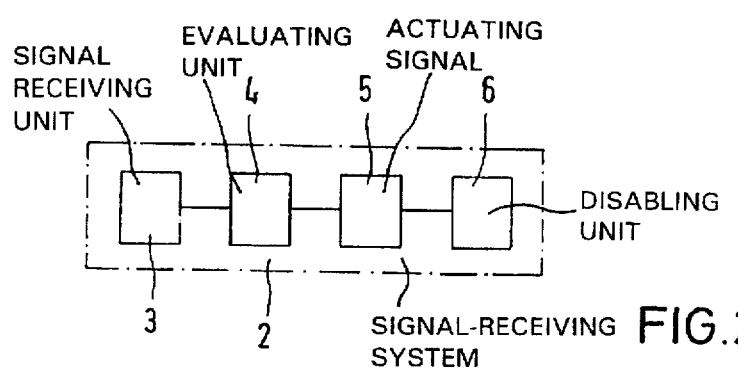

SYSTEM FOR RENDERING A HAND WEAPON INOPERABLE

CROSS REFERENCE TO RELATED APPLICATION

This application claims the priority of German Application No. 195 23 399.9 filed Jun. 28, 1995, which is incorporated herein by reference.

BACKGROUND OF THE INVENTION

This invention relates to a hand-held weapon such as a pistol, a revolver or rifle or the like.

German Patent No. 1,961,914 discloses an interrogation-response system for secondary radar apparatus, having an IFF (Interrogation Friend or Foe) identification system. In such a system a code is agreed upon for use between an interrogating device and a responding device. To additionally ensure a distinction between genuine and pretended friends and also to exclude undesired interference possibilities, additional information data are added to the response signal. The momentarily valid contents of such additional data in the interrogating device as well as in the responding device is known from the navigation data of the responding device or from a channel separate from the interrogating system, independently of the respective interrogation-response system. Since it is unknown to the adversary which of the possible kind of additional information is being used, an imitation of responses is rendered extremely difficult.

German Offenlegungsschrift (application published without examination) No. 29 19 753 discloses an apparatus formed of a stationary interrogation device and a responding device affixed to an object. The interrogation device has an energy transmitter, a receiver and an evaluating unit, while the responding device is provided with an energy receiver, an energy converter, a circuit unit and at least one antenna. To securely prevent an undesired transmission of stored data, additional opening codes are incorporated in the interrogation device and the responding device.

Further, German Offenlegungsschrift No. 35 24 143 discloses an IFF system which has a radio transmitter and receiver device and which is adapted to send, receive and evaluate IFF signals in addition to handling message traffic. Such known apparatus operates with a radio transmission of interrogating and responding signals and uses a laser distance measuring device as a light transmitter. By means of the integrated radio device it is feasible to receive and evaluate interrogating signals arriving from another object while an earlier identification process is already in progress, without the need for interrupting the process already in progress.

Police and military authorities have been contemplating a superordinated control of authorized use of hand weapons. For such considerations the fact is being taken into account that the nature of military and police actions has been undergoing changes. While long and geographically extensive wars are fought less and less, limited troop actions having a police character are increasing in frequency. Upon conclusion of such actions, often a great number of abandoned hand weapons remain in the region of the action, posing a significant danger to safety.

SUMMARY OF THE INVENTION

It is an object of the invention to provide a system which reduces the danger of unauthorized use of abandoned hand weapons.

This object and others to become apparent as the specification progresses, are accomplished by the invention, according to which, briefly stated, a signal-receiving system is provided which is incorporated in the hand weapon and includes a signal-receiving unit for receiving a coded signal and an evaluating unit connected to the signal-receiving unit for receiving the coded signal therefrom, for processing the coded signal and for emitting an actuating signal as a function of the coded signal for affecting operationally essential elements of the hand weapon.

Thus, according to the invention, a universal receiver is provided, by means of which a hand weapon may receive signals and, based thereon, emit an output signal which may be used for purposes as desired. Thus, a possibility of application is seen in receiving the appropriate coded signal and after evaluation to activate a destroying unit which disables the hand weapon in its entirety.

BRIEF DESCRIPTION OF THE DRAWING

FIG. 1 is a side elevational view of a hand weapon and a block diagram of an IFF system associated therewith.

FIG. 2 is a block diagram of a signal-receiving system built into the hand weapon.

DESCRIPTION OF THE PREFERRED EMBODIMENT

FIG. 1 illustrates a pistol 1 having, in an appropriate space provided therein, a built-in universal signal-receiving system 2 which, as illustrated in FIG. 2, includes a signal receiving unit 3 and an evaluating unit 4 connected thereto. After evaluation of the received, coded signal, the evaluating unit generates an output (actuating) signal 5 which is applied to a destroying (disabling) unit 6 which may be a pyrotechnical device.

The signal receiving unit 3 detects a coded signal carried, for example, by a radio wave 7 from a central transmitting unit 8 of a military or police establishment 9. Alternatively or additionally to the radio signal connection between the unit 8 and the system 2, an additional signal path 10 may be established between the transmitter 8 and a satellite 11. The satellite 11 transmits the signal from the transmitter 8 along a signal path 12 to the signal-receiving system 2 of the hand weapon 1.

The signal emitted by the transmitter 8 first effects evaluation of the coded signal, to which additional information and command data are added. Upon evaluation of the signal, the unit 4 emits an actuating signal 5 applied to the disabling unit 6. This means that at a predetermined moment the weapon 1 can be intentionally destroyed or at least incapacitated. As a disabling unit 6 usually a pyrotechnical device is used which, at a designed location of the weapon affects functionally vital elements of the hand weapon 1.

Another embodiment includes a non-illustrated clock element which may, for example, replace the receiver unit 3 or which may constitute a component of the disabling unit 6. After a previously set time period has lapsed, a signal is emitted and applied to the disabling unit 6 which is thereupon activated and incapacitates the hand weapon in its entirety by means of a pyrotechnical unit. In the alternative, such signal may be applied to a circuit of a mechanical or electronic lock for disabling the weapon 1.

It will be understood that the above description of the present invention is susceptible to various modifications, changes and adaptations, and the same are intended to be comprehended within the meaning and range of equivalents of the appended claims.

What is claimed is:

1. A combination of a signal-receiving system and a hand weapon; said signal-receiving system being incorporated in the hand weapon and comprising (a) a signal-receiving unit for receiving a coded signal;

(b) an evaluating unit connected to said signal-receiving unit for receiving the coded signal therefrom, for processing the coded signal and for emitting an actuating signal as a function of the coded signal for affecting operationally essential elements of said hand weapon; and (c) a disabling unit connected to said evaluating unit, wherein said disabling unit comprises a pyrotechnical unit and incapacitates said hand weapon upon receipt of said actuating signal.

2. A combination of a signal-transmitting system, a signal-receiving system and a hand weapon; said signal-transmitting system being on board a satellite and comprising a coded signal transmitting unit; said signal-receiving system being incorporated in the hand weapon and comprising (a) a signal-receiving unit for receiving the coded signal; and (b) an evaluating unit connected to said signal-receiving unit for receiving the coded signal therefrom, for processing the coded signal and for emitting an actuating signal as a function of the coded signal for affecting operationally essential elements of said hand weapon.

* * * * *